July 12, 1927.

G. L. TULLY 1,635,867

GOGGLES

Filed March 2, 1925

Inventor

George L. Tully.

By Harry H. Styll

Attorney

Patented July 12, 1927.

1,635,867

UNITED STATES PATENT OFFICE.

GEORGE L. TULLY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

GOGGLES.

Application filed March 2, 1925. Serial No. 12,663.

This invention relates to opthalmic mountings, and has particular reference to an improved and more efficient goggle structure.

An important object of this invention is to provide a goggle simple of construction, light of weight, and inexpensive of manufacture.

Another important object of this invention is to provide a goggle in which lenses may be easily and quickly inserted or removed.

Still another object of this invention is to provide a goggle structure having simple and easily operated means for rigidly clamping the lenses in the eye pieces.

Other objects and advantages of this invention, together with the details of construction of the same, will readily become apparent during the course of the following description.

In the drawing forming a part of this specification, and in which I have employed like numerals to designate corresponding parts throughout all views of the same:

Figure 1:
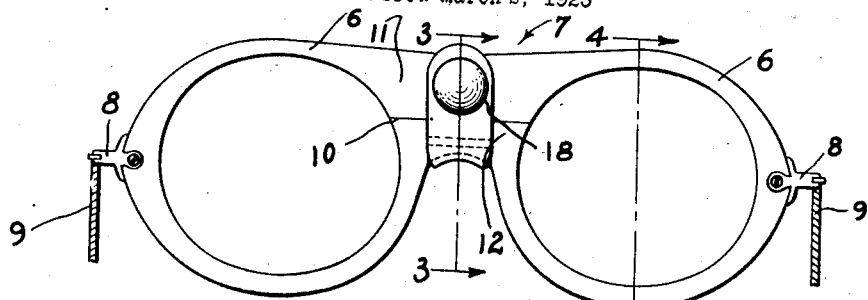
Figure 1 is a front elevation of the goggle.
Figure 2:
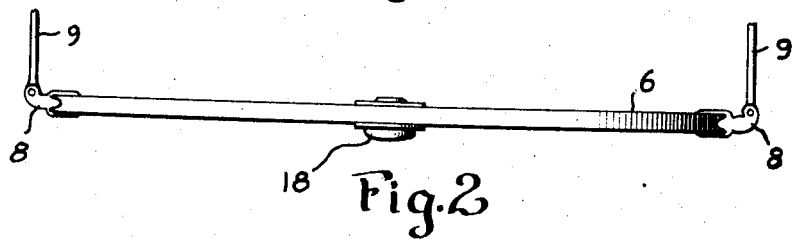
Figure 2 is a top plan view of the same.

In the use of goggles by workmen engaged in welding or similar industries, wherein they are subjected to a great degree of heat, the use of the ordinary type of goggle is impractical from a good many standpoints. The only purpose of a goggle used in this work is to shield the eyes of the wearer from the injurious rays of the welding flame, such that any means for interposing between the light and the wearer's eyes a lens of light absorption glass meets the necessary requirements. The usual goggle structures comprising as they do, heavy eye cups which fit close to the face of the wearer, not only hinder the work of the operator by obstructing vision to a great extent, but also become unbearably hot, and cause the eyes of the operator to perspire and the lenses to subsequently become clouded with steam.

It is the purpose of this invention to provide a goggle which is light of weight, substantially spaced from the face of the operator, and yet which will answer in every way the requirements for work of this character.

Referring, then, particularly to the drawing, wherein I have shown the preferred embodiment of this invention, the numeral 6 designates a pair of eye pieces connected by a suitable temple 7, and being further provided with the usual end pieces 8 and temple cords 9. The bridge 7 is provided with a longitudinal slit 10 extending between the two eyes of the goggle, whereby the same is divided into an upper portion 11 and a lower portion 12. Mounted substantially in the center of the upper portion 11 and extending therethrough is a rivet 13 provided on one end with the head 14 and on the other with a stud 15 adapted to receive the base member 16 of a snap fastener. Rigidly clamped intermediate the head 14 of the rivet 13, and the body portion of the bridge 11, is a strap 17 adapted to encircle the lower half 12 of the bridge 7, and having secured on its free end the head 18 of a snap fastener adapted to engage with the base 16 before mentioned.

In the preferred embodiment of this invention the lower portion 12 of the bridge 7 is channeled as at 19 to provide a groove in which is secured by a suitable rivet 20 the base portion 21 of a resilient pad 22 adapted to form resilient bearing means for the strap 17 to retain the same in taut position at all times.

Figures 3, 4, 5:
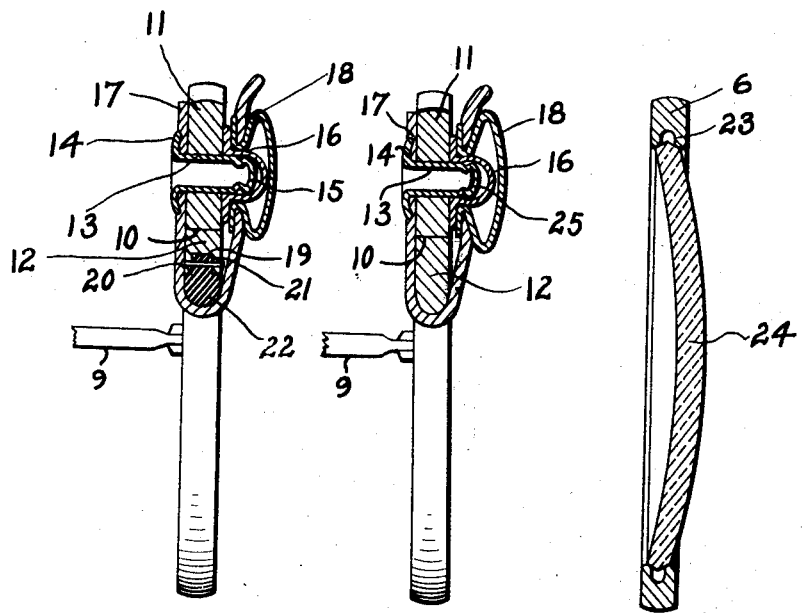
Figure 3 is a transverse sectional view taken on line 3—3 of Figure 1.
Figure 4 is a transverse sectional view taken on line 4—4 of Figure 1.
Figure 5 is a view similar to Figure 3, showing a modification of this invention.

In Figure 4 of the drawing it may clearly be seen that the eye pieces 6 are internally grooved, as at 23, to provide retaining means for a suitable lens such as 24.

In Figure 5 of the drawing I have shown a slight modification of this invention, in which the pad 22 is eliminated, the strap 17 merely encircling the two portions of the bridge. In the practical construction of this goggle I prefer to form the same from some inexpensive and light material, such as fiber, and to make the same of one piece. While I have found fiber particularly applicable, any suitable material, provided it is slightly resilient, will serve if it is capable of being bent or sprung so as to separate the bridge at the split 10. In inserting lenses such as 24, in a goggle of this structure, the snap fastener is unfastened and the strap allowed to hang free. With the strap in this position the two portions of the bridge may be sprung apart, whereby the eye pieces of the goggle are enlarged sufficiently to easily allow of the insertion of a lens. After the lenses have been inserted in the eye pieces, and the edges of the same fit into the grooves 23, the frame is allowed to spring together again and is clamped in this position by means of the strap 17 and the head 18 of the snap fastener engaging with the base 16 thereof. In use it has been found that the resilient pad 22 not only forms a comfortable nose pad, but also forms resilient means whereby the strap 17 is kept tight at all times and various minor differences in the sizes of the lenses to be inserted compensated for.

From the foregoing description it may clearly be seen that I have provided a goggle structure in which the lenses may be easily inserted with a minimum amount of trouble, and in which it is possible to constantly insert or remove lenses without in any way decreasing the efficiency of the frame. It will still further be seen that a goggle constructed in accordance with this invention will be very inexpensive, will be light and will be thoroughly adapted for the use of an operator engaged in welding or similar processes.

While I have shown and described two preferred forms which I desire to consider as the preferred embodiments of this invention, it is to be understood that in the practical manufacture and use of the same it is expected that various changes will suggest themselves, so that I reserve the right to make these changes as to structure, shape and arrangement of parts, in so far as I remain within the spirit of this invention and the scope of the appended claims.

Having thus described my invention, I claim:

1. A goggle having two eyes and a split connecting bridge, a strap secured to one half of the bridge and adapted to be fastened about the second half of the bridge to clamp the two halves together, and a resilient cushion carried by the second half of the bridge and underlying the strap whereby its resilience will stretch the strap to make it hold the two halves of the bridge closely together.

2. In a device of the character described in combination with a lens frame having a pair of lens rims connected by a bridge having a longitudinal split and a portion to fit the nose a resilient member on the nose fitting portion, a strap secured to one of the split portions of the bridge and extending around and over the resilient member and interengaging means on the strap and the split portion of the bridge to which it is secured adapted to hold the split portions closely together through the action of the resilient member.

3. In a device of the character described in combination with a lens frame having a pair of lens rims connected by a bridge having a longitudinal split and a portion to fit the nose, a resilient member on the nose fitting portion, a strap extending from one split portion around and over the resilient member, a male snap member extending through one of the split portions and securing the strap thereto and a female snap member on the strap adapted to engage the male snap member and hold the split members closely together through the action of the resilient member.

4. In a device of the character described in combination with a lens frame having a pair of lens rims connected by a bridge having a longitudinal split, a resilient member on one of the split portions, a strap connected to one of the split portions extending over the resilient member and around the other split portion, and interengaging members on the first split portion and the strap adapted to hold the two split portions closely together through the action of the resilient member.

GEORGE L. TULLY.